United States Patent
Cheston et al.

(10) Patent No.: US 6,944,867 B2
(45) Date of Patent: Sep. 13, 2005

(54) METHOD FOR PROVIDING A SINGLE PRELOADED SOFTWARE IMAGE WITH AN ABILITY TO SUPPORT MULTIPLE HARDWARE CONFIGURATIONS AND MULTIPLE TYPES OF COMPUTER SYSTEMS

(75) Inventors: Richard Wayne Cheston, Morrisville, NC (US); Daryl Carvis Cromer, Apex, NC (US); Jeffrey Mark Estroff, Cary, NC (US); James Anthony Hunt, Chapel Hill, NC (US); Howard Jeffrey Locker, Cary, NC (US); Joshua Neil Novak, Raleigh, NC (US); Randall Scott Springfield, Chapel Hill, NC (US); James Peter Ward, Raleigh, NC (US); Arnold Stephen Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 620 days.

(21) Appl. No.: 09/971,942

(22) Filed: Oct. 4, 2001

(65) Prior Publication Data

US 2003/0069999 A1 Apr. 10, 2003

(51) Int. Cl.⁷ ................................................ G06F 9/24
(52) U.S. Cl. ............................ 719/327; 713/100; 713/2
(58) Field of Search .............................. 713/100, 2, 1; 719/327, 321

(56) References Cited

U.S. PATENT DOCUMENTS

| | | | |
|---|---|---|---|
| 5,291,585 A | 3/1994 | Sato et al. | |
| 5,325,532 A | 6/1994 | Crosswy et al. | |
| 5,404,494 A | 4/1995 | Garney | |
| 5,598,563 A | * 1/1997 | Spies | 713/2 |
| 5,613,123 A | 3/1997 | Tsang et al. | |
| 5,640,562 A | 6/1997 | Wold et al. | |
| 5,701,476 A | 12/1997 | Fenger | |
| 5,701,483 A | 12/1997 | Pun | |
| 5,887,169 A | 3/1999 | Lacombe | |
| 6,081,850 A | 6/2000 | Garney | |
| 6,138,179 A | * 10/2000 | Chrabaszcz et al. | 710/10 |
| 6,202,147 B1 | 3/2001 | Slaughter et al. | |
| 6,209,089 B1 | 3/2001 | Selitrennikoff et al. | |
| 6,317,826 B1 | * 11/2001 | McCall et al. | 713/1 |
| 6,539,456 B2 | * 3/2003 | Stewart | 711/113 |
| 6,542,979 B1 | * 4/2003 | Eckardt | 711/173 |
| 6,560,702 B1 | * 5/2003 | Gharda et al. | 713/2 |
| 6,718,463 B1 | * 4/2004 | Malik | 713/2 |

FOREIGN PATENT DOCUMENTS

| | | |
|---|---|---|
| EP | 0622731 A1 | 11/1994 |
| JP | 8305652 | 11/1996 |

* cited by examiner

Primary Examiner—Lewis A. Bullock, Jr.
(74) Attorney, Agent, or Firm—Ronald V Davidge

(57) ABSTRACT

The hard disk drive of a computer system is loaded with a preloaded image including an operating system, a number of application programs, and a device driver installation routine, all of which are not dependent on the hardware configuration of the computer system. A hidden partition of the hard disk drive is also loaded with a number of device drivers, which are dependent upon the hardware configuration. During the first boot only of the preloaded image, the device drivers are installed by the device driver installation routine.

27 Claims, 3 Drawing Sheets

METHOD FOR PROVIDING A SINGLE PRELOADED SOFTWARE IMAGE WITH AN ABILITY TO SUPPORT MULTIPLE HARDWARE CONFIGURATIONS AND MULTIPLE TYPES OF COMPUTER SYSTEMS

BACKGROUND OF THE INVENTION

1. Field of the Invention

This invention relates to developing a preloaded image of programs and data to be loaded into a computer system before it is delivered to an end user, and, more particularly, to developing such an image in a form that is independent of the hardware configuration of the computer system, and to additionally providing for the installation of device drivers that depend on the hardware configuration.

2. Summary of the Background Art

A typical computing system is delivered to an end user with a "preloaded" image of programs and data, including an operating system, application programs, and various drivers associated with the hardware of the computing system. Generally, large orders of computing systems from a single organization are delivered to the organization without this kind of an image. Then, the image is "preloaded" by an information technology specialist employed by the organization. On the other hand, computers sold in small numbers are generally delivered with the "preloaded" image having been loaded by the manufacturer, or, conceivably, by a value-added retailer.

Generally, the operating system and the application programs receive the most attention from the end user in terms of their perceived value. However, the device drivers are needed to allow operation of various hardware devices within the computing system.

FIG. 1 is a pictographic view of programs and data stored within the hard disk drive 10 of a conventional computing system in the form in which the system is delivered to the end user. This data includes a preloaded image 12, which in turn includes an operating system 14, a number of application programs 16, and a number of device drivers 18. The operating system 14, when loaded, controls the allocation and usage of various hardware resources of the computing system and provides a software foundation for the operation of the application programs 16, and for other application programs which may be subsequently installed. The application programs 16 are each designed to perform a specific task, such as word processing, spreadsheet calculations, accounting, or maintaining address book data. Each of the device drivers 18 permits the computer system to communicate with a particular hardware device within the computer system or with an external device attached to the computer system. Various device drivers 18 may manipulate the associated hardware device to allow the transmission of data to the device, while other device drivers 18 only perform a data translation function. A central hierarchical database 20, associated with the operating system 14 includes data used to locate and use the various device drivers 18. During subsequent operation of the computing system, the device drivers 18 are accessible to the operating system 14 and to the application programs 16. The preloaded image 12 also includes the master boot record (MBR) 22, stored in the first sector within the hard disk drive 10. The MBR 22 stores instructions to locate and begin the process of loading the operating system 14.

For example, if the operating system 14 is Microsoft WINDOWS 9x, WINDOWS CE, WINDOWS NT, WINDOWS 2000, or WINDOWS Me, the database 20 includes a first branch of the Registry, which stores a file known as a key for each entry. The key includes values that specify the type of entry, which may be associated with a device driver, with a service routine, or with a file system. The key also includes a pointer to the location of the device driver or service routine and a value that determines the order in which the device driver or service routine is loaded. The value associated with a device drive indicates that it is to be loaded at boot start by the operating system loader, later by the I/O manager of the operating system after executive subsystems have been loaded, or only on demand. In addition, if the operating system 14 is one of these versions of WINDOWS, the device drivers 18 are stored in a second branch 23 of the registry.

Thus, the device drivers 18 are dependent on the hardware configuration of the computing system. They are, in fact, a reflection of this hardware configuration, including the code necessary to operate these hardware devices. This dependency means that a different preloaded image 18 is needed for each hardware configuration. This requirement places a burden on the organization and individuals preparing and preloading the image 18. For example, it these individuals are responsible for supplying a range of different types of computing systems to end users, a different preloaded image must be developed and loaded for each type of computing system. In addition, when a new type of computer is added to the systems to be delivered, a new image 18 must be developed. Thus, what is needed is a method for using a preloaded image that is independent of the hardware configuration, so that the same preloaded image can by used across a number of different hardware configurations or platforms.

In order to accommodate hardware changes and upgrades, which are expected to occur, the operating system 14 includes means for installing additional device drivers, which are not installed as part of the preloaded image 18. For example, recent versions of Microsoft WINDOWS support a PLUG AND PLAY feature that recognizes installed or connected hardware devices for which a device driver has not been installed, and that then proceeds to find the device driver among a number of uninstalled device drivers stored within data associated with the operating system 14. The device driver may also be installed from a removable medium, such as a compact disk supplied with the operating system or a floppy diskette supplied with a new hardware device.

However, this ability of the operating system 14 to install device drivers cannot be reasonably used as an alternative to installing the necessary device drivers 18 as a part of the preloaded image 18. Even if all of the necessary device drivers were found among the data associated with the operating system 14, the installation of these drivers individually as installed hardware devices are discovered would take far too much time during the initial booting of the operating system 14. Furthermore, there is a likelihood that one or more of the necessary device drivers would not be readily found, and that user intervention would be required to provide removable media storing the device drivers. Thus, what is needed is a method for using a preloaded image that is independent of the hardware configuration while retaining an ability to install device drivers during system initialization.

Thus, the conventional operating system 16 is "transportable," being used on a number of different kinds of computer systems. For example, various versions of Microsoft WINDOWS are each used on a wide variety of types of computing systems, from large desk-top systems to laptop systems.

One method for making an operating system transportable in this sense is described in U.S. No. 5,325,532 as a transportable operating system which can be readily configured on a relatively isolated computing system. All non-hardware related functions are contained in a transportable portion of the operating system, while hardware and potential hardware functions are developed through a hardware abstraction layer through appropriate interfaces and calls. The hardware abstraction layer is broken down into a main system read only memory (ROM), which contains a certain minimal number of functions, and various hardware modules, which may be located in ROM or on an adapter board. While a number of U.S. patents describe methods for reducing the level of dependence that device drivers have on the details of a particular hardware configuration, there is no reason to believe that the application of such methods can result in the development of an array of device drivers which is truly independent of the hardware configuration. For example, U.S. Pat. No. 5,291,585 defines a feature table that tracks peculiarities of the actual hardware allowing applications that write directly to the hardware devices to understand what these devices can and cannot do. What is needed is a method allowing installation preloaded image independent of the hardware configuration without placing an additional burden on application programs and without restricting the kinds of application programs which can be run.

While another patent describes ways of modifying an operating system to provide hardware-dependent capabilities, there is no reason to believe that this method can be expected to eliminate a need to install hardware-dependent device drivers. Thus, U.S. Pat. No. 5,640,562 describes a way to incorporate new installation scripts into an existing operating system in order to install and reboot a system using a new platform-specific kernel and new device-specific drivers.

U.S. Pat. No. 5,701,483 describes a device-driver interface for achieving portability of device drivers for operating with a full source level of compatibility across multiple instruction set architectures and platforms. The device driver interface makes transparent to the driver the actual data access mechanisms of the host computers on which the driver is compiled. However, this method leaves the device drivers dependent on the characteristics of the device being driven, so a convenient method of loading hardware-dependent device drivers is still needed.

U.S. Pat. No. 5,291,585 describes a computer system with a self-describing feature table, accessible by device drivers, with a simple process being able to access these feature tables to fully customize the device drivers at installation, or at boot. The device drive may be able to branch on the data in the feature table. However, there is no indication that such a method can eliminate the hardware-dependence of a device drive when it is installed.

U.S. Pat. No. 5,887,169 describes a technique for enhancing a software layer while ensuring backwards compatibility. In one implementation, the software layer is a hardware abstraction layer (HAL) that interfaces between hardware and an operating system. The HAL can be enhanced with additional functionality without having to worry about crashing the operating system if the old hardware is used with the new HAL. Again, there is no indication that the use of this technique eliminates a need to load hardware dependent drivers during system initialization.

U.S. Pat. No. 6,209,089 describes a method for using a temporary connection between a client computer system and a server to update portions of an operating system and device drivers following changes to the client computer system. The server sends information describing the previous hardware configuration of the client system. Then, the client system determines differences between its current configuration and its previous configuration, and sends information describing new devices to the server. The server identifies new drivers and components of the operating system, and stores them in locations from which they are downloaded to the client computer. What is needed is a method for loading device drivers corresponding to the hardware of an actual system without requiring the establishment of a connection with a server or other procedures requiring operator interaction.

SUMMARY OF THE INVENTION

In accordance with a first aspect of the invention a computer readable medium is provided within a computing system. The computer readable medium has first and second structures of computer readable code recorded thereon for providing data and program instructions for use within the computing system. The first structure of computer readable medium includes a number of device drivers associated with devices within the computing system. The second structure is bootable within the computing system. The second structure includes an operating system, executable within the computing system, and a device driver installation routine, executable within the computing system to install device drivers in the plurality of device drivers when the second structure is booted for the first time.

Preferably, the device driver installation routine includes a first step causing installation of the device drivers when the second structure is booted for the first time, and a last step causing the operating system to be booted.

BRIEF DESCRIPTION OF THE INVENTION

DETAILED DESCRIPTION OF THE INVENTION

Figure 2:
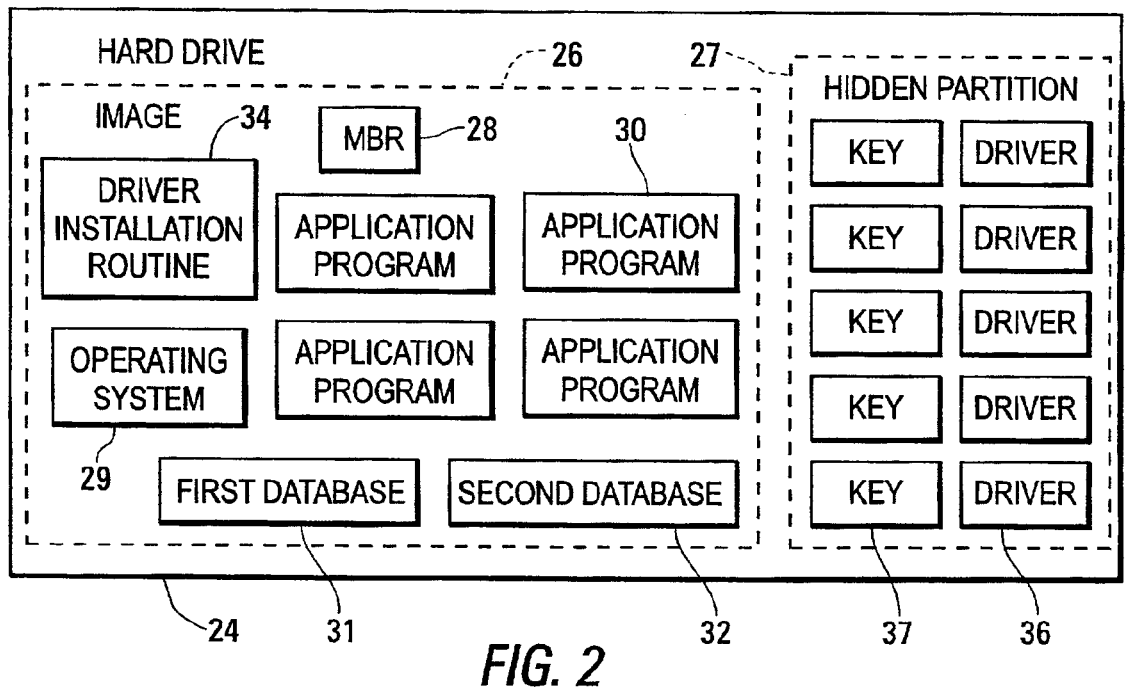
FIG. 2 is a pictographic view of programs and data stored on the hard disk drive of a computing system prepared for delivery to an end user in accordance with the present invention.

FIG. 2 is a pictographic view of programs and data stored on the hard disk drive 24 of a computing system prepared for delivery to an end user in accordance with the present invention. This data includes a preloaded image 26, storing programs and data that are not dependent on the hardware configuration of the computing system, and a hidden partition 27, storing programs and data that are dependent on the hardware configuration. For example, the preloaded image 26 stores an MBR 28 (master boot record), an operating system 29, a number of application programs 30, together with a first database 31 and a second database 32, both of which are associated with the operating system 29. The first database 31 is provided for storing pointers or keys that point to the locations of installed device drivers. The second database 32 is for storing installed device drivers. The preloaded image 26 also stores a driver installation routine 34 that is subsequently used to install configuration-dependent routines and data stored in the hidden partition.

The hidden partition 27 stores a number of device drivers 36, each of which is dependent on the hardware configuration of the system, along with a number of keys 37, which point to the locations at which the individual device drivers 36 are to be stored when they are subsequently installed.

For example, if the operating system 29 is Microsoft WINDOWS 9x, WINDOWS CE, WINDOWS NT, WINDOWS 2000, or WINDOWS Me, the first database 31 is provided within a first branch of the Registry, and the second database 32 is provided within a second branch of the Registry. The key 31 for each device driver 36 includes a value specifying the associated entry as a device driver, a pointer to the location of the device driver where it will be placed within the second database when it is installed, and a value that determines the order in which the device driver or service routine is loaded.

Figure 1:
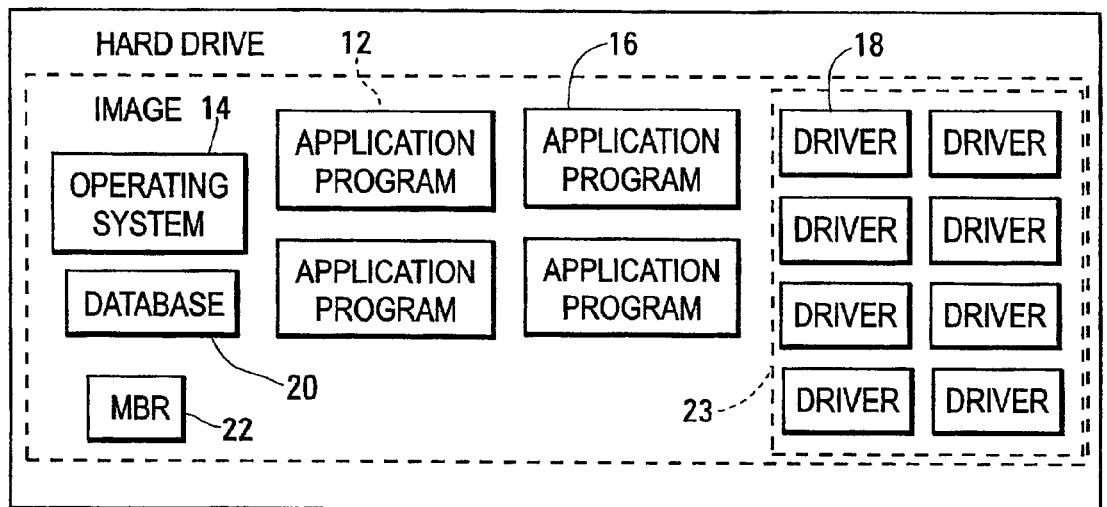
FIG. 1 is a pictographic view of programs and data stored on the hard disk drive of a conventional computing system prepared for delivery to an end user.
Figure 3:
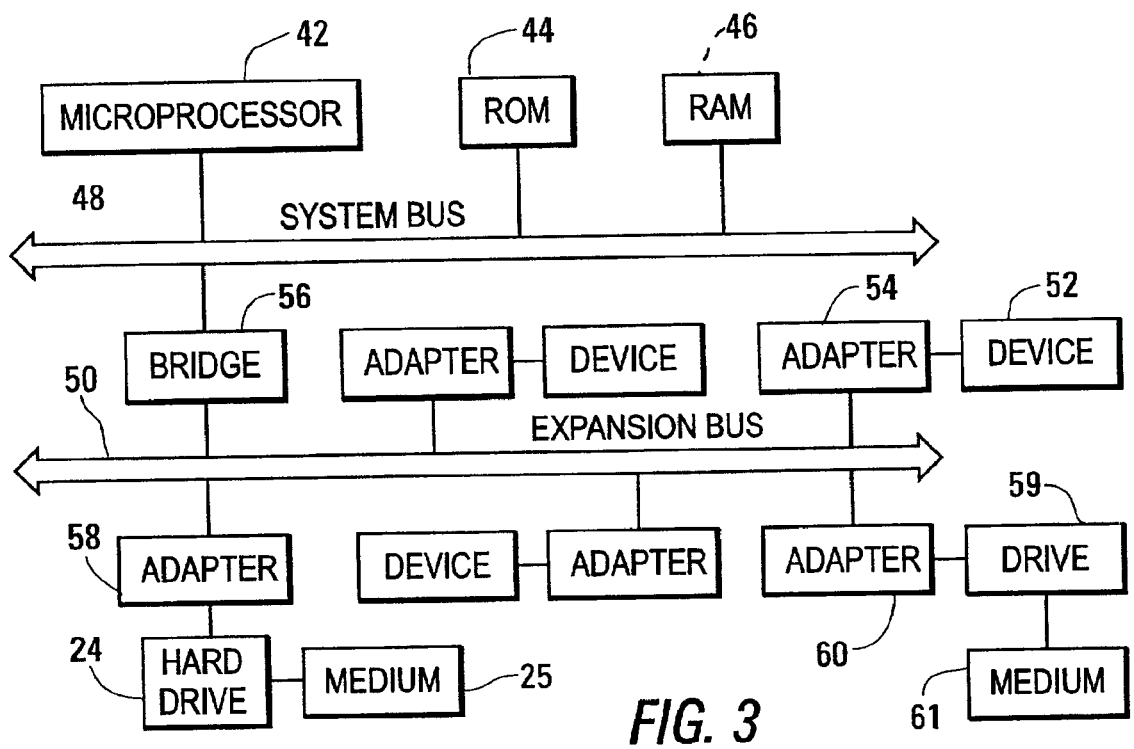
FIG. 3 is a block diagram of an exemplary computing system operating in accordance with the present invention.

FIG. 3 is a block diagram of an exemplary computing system 40 operating in accordance with the present invention. The computing system 40 includes a microprocessor 42 connected to a read-only memory ROM 44 and a random-access memory 46 by means of a system bus 48. The ROM 44, which may alternately be a programmable device, such as a flash memory, stores an initialization program, called BIOS (basic input/output system), which begins execution when the computing system 10 is turned on. The computing system 10 also includes an expansion bus 50, to which a number of hardware devices 52 are connected through adapter circuits 54. The expansion bus 50 is connected to the system bus 48 by means of a bridge circuit 56. While the expansion bus 50 is shown as a single entity, it is understood to represent a number of buses connected through appropriate bridge circuits. For example, a ISA (industry standard architecture) bus may be used to provide connections to certain of the devices 52, while one or more PCI (Peripheral Component Interconnect) bus(es) is/are used to provide connections to other devices 52. The hard disk drive 24, storing instructions and data on a computer readable medium 25 as described above in reference to FIG. 1, is connected to the expansion bus 50 through an adapter circuit 58. In general, instructions and data are read from the hard disk drive 24 and written into the RAM 46 for execution within the microprocessor 42. The computing system 40 also includes another drive 59 connected to the expansion bus 50 through an adapter 60, reading a removable medium 61, which is used to introduce data and program instructions to the system 10.

Figure 4:
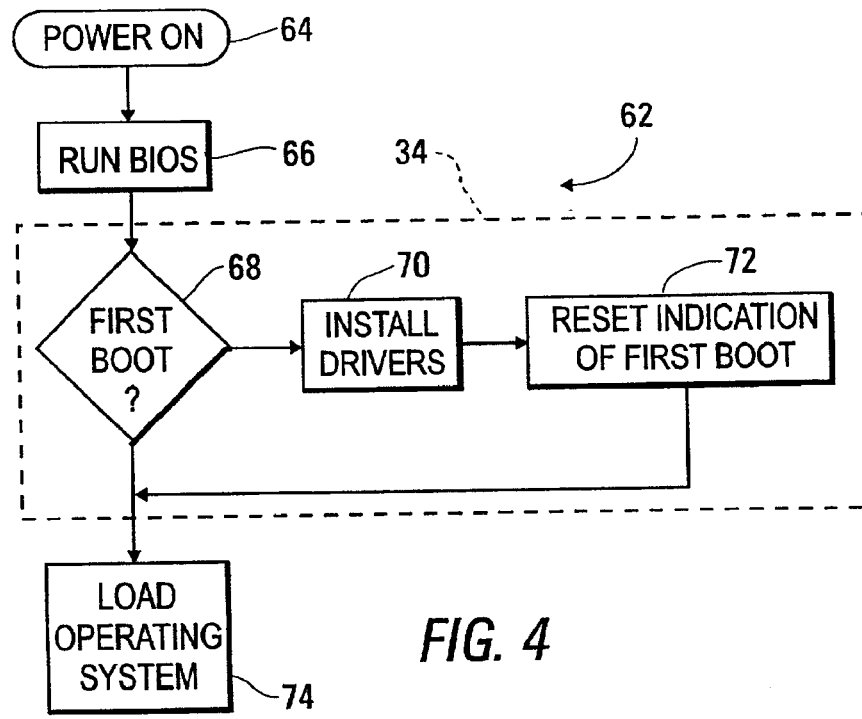
FIG. 4 is a flow chart of a process occurring during initialization of the computing system of FIG. 3 in accordance with the present invention.

FIG. 4 is a flow chart providing a general view of a process 62 occurring during initialization of the computer system 40 in accordance with the present invention. This process is started in step 64 when in electrical power to the system is turned on. In response to an indication that the power has been turned on, the microprocessor 42 begins executing instructions of the BIOS program stored in ROM 44 in step 66. The BIOS program includes a number of diagnostic routines used to check various hardware devices. When the execution of the BIOS program is completed, the system proceeds to a step 68 in which a determination is made of whether the boot presently occurring is the first time the system has been booted. If it is the first boot, the drivers 36 stored in the hidden partition 27 within the hard disk drive 24 are installed in step 70, and a stored indication that the first boot is occurring is reset in step 72. Then, the system proceeds to step 74, in which the operating system 29 is loaded. On the other hand, if it is determined in step 68 that the presently occurring boot is not the first time that the system has been booted, because the indication of the first boot has previously been reset in step 72, the system proceeds directly to step 74, in which the operating system 29 is loaded. In either case, the system 40 operates in a normal manner after loading the operating system 29 in step 74. The steps 68, 70, and 72 are within the driver installation routine 34 stored within the preloaded image 26, as shown in FIG. 2.

Figure 5:
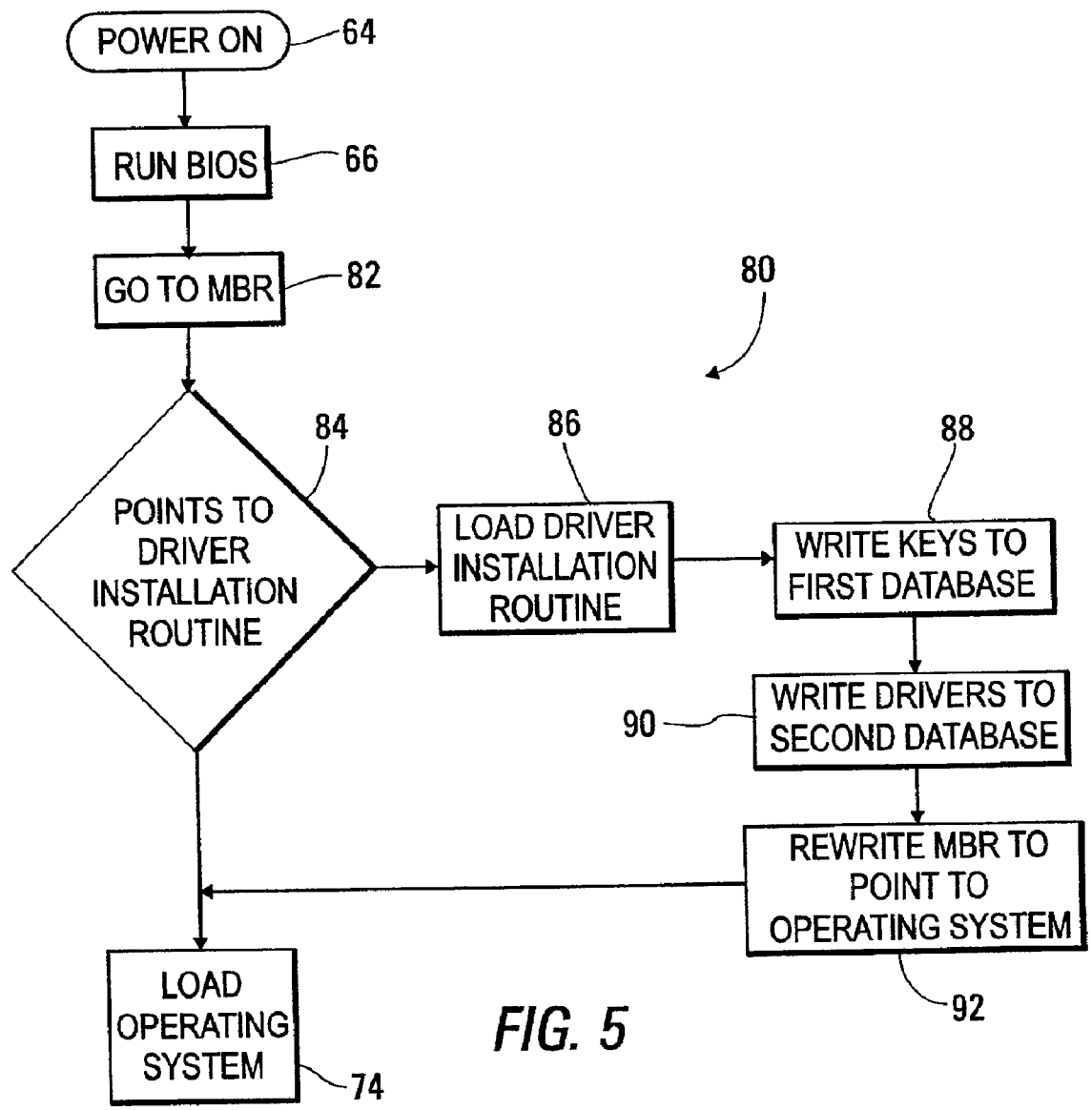
FIG. 5 is a flow chart showing a preferred version of the process shown in FIG. 4.

FIG. 5 is a flow chart showing a preferred version 80 of the process shown in FIG. 4. In this version, after BIOS has been run in step 66, the system proceeds, in a conventional manner and in a step 82 to the MBR 28. In a conventional system, MBR points to a location that is provided to begin the process of loading the operating system. This is also called booting the operating system, which is referred to as bootable code. However, in the preloaded image 26 of the present invention, the MBR 28 points to a location that is provided to begin the process of loading the driver installation routine 34. Thus, when a determination is made in step 84 that the MBR 28 points to the driver installation routine 34, the system proceeds to load the driver installation routine 34 in step 86. Then, in step 88, the keys 37 are written from the hidden partition 27 to the first database 31. Next, in step 90, the drivers 36 are written from the hidden partition 27 to the second database 32. This portion of the process can occur in a different order, such as with each key and its associated device driver being written before the next key and its associated device driver is written. Then, in step 92, the MBR 28 is rewritten to point to the operating system 29. Finally, with the driver installation routine complete, the operating system 29 is loaded in step 74, to be run in a conventional manner.

When the system is subsequently booted, a determination is made in step 84 that the MBR 28 points to the operating system 29, not to the driver installation routine 34, so the system proceeds to load the operating system 29 in step 24, again to be run in a conventional manner.

Thus, the step 68 of FIG. 4, in which a determination is made of whether the boot presently occurring is the first boot, is preferably accomplished through going to the MBR 28 in step 82 and determining whether the MBR points to loading the driver installation routine 34 or to loading the operating system 29. The step 72 of FIG. 4, in which the indication of a first boot is reset, is preferably accomplished by rewriting the MBR 28 to point to loading the operating system 29. In addition, the step 70 of FIG. 4 of installing the drivers 36 is preferably accomplished by writing the keys 37 to the first database 31 in step 88 and by writing the device drivers 36 to the second database 32 in step 90.

The device drivers 36 and keys 37 are preferably stored, as described above in reference to FIG. 2, in a hidden partition 27 holding information that cannot be accessed after the first boot, during normal operations of the computing system 40, under control of the user and of the operating system 29. When the drivers 36 and keys 37 are written to the databases 31, 32 in states 88, 90, these drivers 36 and 37 are left in place within the hidden partition 27, where they cannot be corrupted, during normal operations, because they cannot be accessed. Thus, if the drivers written to the databases 32. 32 become corrupted, they can be replaced through the use of a recovery program having an ability to access data within the hidden partition 27. Alternately, the device drivers 36 and keys 37 may be stored at other locations within the hard disk drive 10.

While the preceding discussion has described the storage of device drivers 36 and keys 37 in the hidden partition 27, it is understood that other routines sensitive to the particular hardware configuration of the computing system 40 can be stored in this way. A routine of this type may, for example, control power management features in a laptop computer.

The device drivers 36 are preferably written to the hidden partition 27 by the system manufacturer before the computing system 40 is sent to an area in which it is prepared for shipment to an end user by writing the contents of the preloaded image 26. Such an area may be operated by the system manager or by a customer buying a large number of systems. In either case, the preloaded image 26 does not need to be changed when a new type of computing system is introduced to the process, or when the preloaded image 26 must be loaded into a number of different types of computer systems.

While the invention has been described in its preferred form or embodiment with some measure of particularity, it is understood that this description has been given only as an example, and that numerous changes can be made without departing from the spirit and scope of the invention.

What is claimed is:

1. A computer readable medium within a computing system having first and second structures of computer readable code recorded thereon for providing program instructions for use within said computing system, wherein
    said first structure includes a plurality of device drivers associated with devices within said computing system,
    said second structure is bootable within said computing system,
    said second structure includes an operating system, executable within said computing system, and a device driver installation routine, executable within said computing system to install device drivers in said plurality of device drivers when said second structure is booted for the first time,
    said device driver installation routine includes a first step causing installation of said device drivers when said second structure is booted for the first time, and a last step causing said operating system to be booted, and
    following said installation of said device drivers, said first step is modified to cause said operating system to be booted.

2. The computer readable medium of claim 1, wherein
    said first step includes a pointer to a step beginning a process of installing said device drivers, and
    following said installation of said device drivers, a coded instruction describing said first step is rewritten to point to a step beginning a process of loading said operating system.

3. The computer readable medium of claim 2, wherein
    said computer readable medium is within a hard disk drive within said computing system,
    said first step includes reading a portion of a master boot record of said
    hard disk drive pointing to said step beginning said process of installing said device drivers, and
    following said installation of said device drivers, said master boot record is rewritten to point to said step beginning said process of loading said operating system.

4. The computer readable medium of claim 1, wherein
    said second structure additionally includes a first database for listing locations of device drivers to be loaded,
    said driver installation routine causes location data to be written to said first database, and
    said driver location data describes locations of said device drivers after said device drivers are installed.

5. The computer readable medium of claim 4, wherein
    said second structure additionally includes a second database for listing locations of device drivers to be loaded, and
    said driver installation routine additionally causes said plurality of device drivers to be written to said second database.

6. The computer readable medium of claim 1, wherein
    said computer readable medium is within a hard disk drive, and
    said first structure is within a hidden partition of said hard disk drive.

7. The computer readable medium of claim 1, wherein said computer readable code within said second structure is additionally executable within a number of different types of computing systems.

8. The computer readable medium of claim 7, wherein said computer readable code within said second structure additionally includes a number of application programs, executable within said computer system.

9. A method for providing program instructions for use within a computing system during a system initialization process, wherein said method comprises:
    a) following a first initialization routine, determining if said system initialization process is occurring for a first time; and
    b) in response to determining that said initialization process is occurring for a first time, performing the following steps c) and d):
    c) installing device drivers from a first structure of computer readable code stored within a hard disk drive of said computing system; and
    d) resetting code indicating that said initialization process is occurring for a first time to indicate that said initialization process has occurred before, wherein step d) is followed by loading an operating system, wherein following said first installation routine, a process executing in said computing system reads a master boot record, wherein before step d) occurs, said master boot record directs said process executing in said computing system to step c), and wherein step d) includes rewriting said master boot record to point to a step beginning a process of loading said operating system.

10. The method of claim 9, wherein step c) includes:
    loading a device driver installation routine stored within a hard disk drive of said computing system in a bootable structure of computer readable code; and
    executing said device driver installation routine to write device driver routines stored within a non-bootable structure of computer readable code within said hard disk drive to a first database within said bootable structure and to write locations of said device driver routines in said first database to a second database within said second database.

11. The method of claim 9, wherein
    said bootable structure additionally stores said operating system, and
    information stored within said bootable structure is not dependent on a specific hardware configuration.

12. A method for providing program instructions for use within a computing system, wherein said method comprises:

storing device drivers corresponding to devices within said computing system in a first structure of computer readable code within a hard disk drive of said computing system; and storing a device driver installation routine and an operating system in a second structure of computer readable code within said hard disk drive, wherein said device driver installation routine is executable within said computing system to install said device drivers when said second structure is booted for the first time, wherein said device driver installation routine includes a first step causing installation of said device drivers when said second structure is booted for the first time, and a last step causing said operating system to be booted, and wherein, following said installation of said device drivers, said first step is modified to cause said operating system to be booted.

13. The method of claim 12, wherein said first step includes a pointer to a step beginning a process of installing said device drivers, and following said installation of said device drivers, a coded instruction describing said first step is rewritten to point to a step beginning a process of loading said operating system.

14. The method of claim 13, wherein said first step includes reading a portion of a master boot record of said hard disk drive pointing to said step beginning said process of installing said device drivers, and following said installation of said device drivers, said master boot record is rewritten to point to said step beginning said process of loading said operating system.

15. The method of claim 12, wherein said second structure additionally includes a first database for listing locations of device drivers to be loaded, said driver installation routine causes location data to be written to said first database, and said driver location data describes locations of said device drivers after said device drivers are installed.

16. The method of claim 15, wherein said second structure additionally includes a second database for listing locations of device drivers to be loaded, and said driver installation routine additionally causes said plurality of device drivers to be written to said second database.

17. The method of claim 12, wherein said first structure is within a hidden partition of said hard disk drive.

18. The method of claim 12, wherein said computer readable code within said second structure is additionally executable within a number of different types of computing systems.

19. The method of claim 18, wherein said computer readable code within said second structure additionally includes a number of application programs, executable within said computer system.

20. A computer system comprising:

a microprocessor;

a system memory;

a hard disk drive including a computer readable medium having first and second structures of computer readable code recorded thereon for providing program instructions for use within said computing system, wherein said first structure includes a plurality of device drivers associated with devices within said computing system, said second structure is bootable within said computing system, and said second structure includes an operating system, executable within said computing system, and a device driver installation routine, executable within said computing system to install device drivers in said plurality of device drivers when said second structure is booted for the first time, said device driver installation routine includes a first step causing installation of said device drivers when said second structure is booted for the first time, and a last step causing said operating system to be booted, and following said installation of said device drivers, said first step is modified to cause said operating system to be booted.

21. The computer system of claim 20, wherein said first step includes a pointer to a step beginning a process of installing said device drivers, and following said installation of said device drivers, a coded instruction describing said first step is rewritten to point to a step beginning a process of loading said operating system.

22. The computer system of claim 21, wherein said first step includes reading a portion of a master boot record of said hard disk drive pointing to said step beginning said process of installing said device drivers, and following said installation of said device drivers, said master boot record is rewritten to point to said step beginning said process of loading said operating system.

23. The computer system of claim 20, wherein said second structure additionally includes a first database for listing locations of device drivers to be loaded, said driver installation routine causes location data to be written to said first database, and said driver location data describes locations of said device drivers after said device drivers are installed.

24. The computer system of claim 23, wherein said second structure additionally includes a second database for listing locations of device drivers to be loaded, and said driver installation routine additionally causes said plurality of device drivers to be written to said second database.

25. The computer systemic of claim 20, wherein said first structure is within a hidden partition of said hard disk drive.

26. The computer system of claim 20, wherein said computer readable code within said second structure is additionally executable within a number of different types of computing systems.

27. The computer system of claim 26, wherein said computer readable code within said second structure additionally includes a number of application programs, executable within said computer system.

* * * * *